US 6,660,315 B2

(12) United States Patent
Miller et al.

(10) Patent No.: US 6,660,315 B2
(45) Date of Patent: Dec. 9, 2003

(54) TUBULAR FOOD CASING WITH A SOLID COATING COMPRISING LIQUID SMOKE

(75) Inventors: Fred N. Miller, Naperville, IL (US); Martina König, Wiesbaden (DE); Christian Auf der Heide, Osnabrueck (DE); Dirk Auf der Heide, Alfhausen (DE)

(73) Assignee: Kalle GmbH & Co. KG, Weisbaden (DE)

( * ) Notice: Subject to any disclaimer, the term of this patent is extended or adjusted under 35 U.S.C. 154(b) by 33 days.

(21) Appl. No.: 09/778,760

(22) Filed: Feb. 8, 2001

(65) Prior Publication Data

US 2002/0004088 A1 Jan. 10, 2002

Related U.S. Application Data

(60) Provisional application No. 60/182,023, filed on Feb. 11, 2000.

(51) Int. Cl.[7] ............................................... A23L 1/317
(52) U.S. Cl. ....................................................... 426/105
(58) Field of Search ................................ 426/138, 140, 426/105, 135, 272, 534, 284

(56) References Cited

U.S. PATENT DOCUMENTS

| 2,627,471 A | 2/1953 | Dowd |
| 3,582,364 A | 6/1971 | Rose et al. |
| 4,525,397 A | 6/1985 | Chiu |
| 4,543,282 A | 9/1985 | Hammer et al. |
| 4,563,376 A | 1/1986 | Hammer et al. |
| 5,690,977 A | 11/1997 | Hammer et al. |

FOREIGN PATENT DOCUMENTS

| DE | 1923607 | 11/1969 |
| DE | 198 18 358 A1 | 10/1999 |
| EP | 0088308 A1 | 9/1983 |
| EP | 0109611 | 5/1984 |
| EP | 0468284 A2 | 1/1992 |
| EP | 0559084 A2 | 9/1993 |
| EP | 0700637 A1 | 3/1996 |

*Primary Examiner*—Keith Hendricks
(74) *Attorney, Agent, or Firm*—Connolly Bove Lodge & Hutz LLP

(57) ABSTRACT

The invention relates to a tubular food casing, one surface of which has a continuous layer which is solid under standard conditions of temperature and pressure, prepared from a mixture made from a wax solid under these conditions and/or from a wax-like component, from a liquid smoke, and from an emulsifier with the aid of which a stable water-in-oil emulsion can be formed. The layer adheres firmly to the casing and is also flexible, so that the outer side of the casing can be turned inside out without difficulty. When the sausages produced therewith are cooked or scalded, the wax or the wax-like component melts so that the liquid smoke can migrate onto the surface of the meat emulsion and there produce the desired characteristics of smoking.

16 Claims, No Drawings

TUBULAR FOOD CASING WITH A SOLID COATING COMPRISING LIQUID SMOKE

The instant application claims priority to U.S. Provisional Patent Application No. 60/182,023, filed Feb. 11, 2000.

The present invention relates to a tubular food casing, one surface of which has a continuous layer which is solid under standard conditions of temperature and pressure and comprises a mixture made from a component solid under these conditions and from a liquid smoke. The casing is particularly suitable for producing presmoked sausage products.

Liquid-smoke impregnated, fiber-reinforced cellulose-based tubular food casings have been known for a long time. These casings are usually produced by molding strips made from a wet-strength fiber material—such as strips made from wet-strength hemp-fiber paper—to give a tube, and then treating these with an alkaline cellulose xanthate solution known as viscose solution. The viscose solution is applied here to the tube formed from the fiber material from outside, from inside or from both sides. This is followed by regeneration of the cellulose from the viscose in an acid precipitation bath. This gives seamless casings. In a subsequent step the cellulose hydrate casings may then be treated with liquid smoke. Liquid smoke is generally prepared by dry-heating or carbonization of wood and passing the resultant smoke into water. This liquid smoke comprises a significant proportion of acetic acid and is therefore strongly acid. However, it can also be made weakly acid, neutral or alkaline by adding an appropriate amount of neutralizing agents, such as NaOH. It is also known that the liquid smoke can be modified by adding other components. Examples of these other components are agents which increase viscosity, emulsifiers and vegetable or synthetic oils (EP-A 700 637). The liquid smoke is practically completely absorbed into the cellulose casing.

The casings known as polymer casings have a property profile significantly different from that of cellulose casings. They generally have a significantly lower permeability to oxygen and water vapor. This applies in particular to polymer casings having more than one layer and having layers made from polyolefin, polyvinylidene chloride (PVDC), polyvinyl acetal or similar materials. Polymer casings are generally produced by extrusion or co-extrusion with the aid of an annular die. Although polyamide layers can absorb a small amount of water, their absorbency, like that of other polymer layers, is far too low for impregnation with liquid smoke.

So that liquid smoke can nevertheless be bound to plastic casings of this type it has been proposed that it be combined with a hydrophilic absorbent, such as starch, and an inner coating be produced using this combination. However, no internally coated casing of this type has so far become established in the market.

DE-A 198 18 358 describes a tubular casing which has one or more layers made from plastic and whose inner side was sprayed with a mixture made from liquefied wax and smoke aroma. The wax is a wax approved for human consumption, such as beeswax or carnauba wax. Before spraying it has to be heated to at least 60° C. to be liquefied and mixed with the liquid smoke. The wax-liquid-smoke mixture is generally sprayed under a high pressure of about 170 bar. On cooling this gives a firmly adhering layer comprising the smoke aroma. The resultant casings can be shirred in a manner per se to give what are known as sticks, and then stuffed with sausage emulsion. If the stuffed sausage casings are cooked or scalded in superheated steam or hot water, the wax melts and releases the liquid smoke, which then migrates directly onto the meat emulsion and gives it the desired smoke color, smoke aroma and smoke taste.

However, the wax-liquid-smoke mixture has been found to be very unstable, with separation beginning as little as a few minutes after the mixing procedure has ended. The shelf-life of the mixture of from 1 to 2 hours given in the DE-A is in no case achievable. When a partially separated composition is sprayed the resultant layer is often inhomogeneous and unable to transfer the liquid smoke uniformly when the sausage is subsequently heated.

The object was therefore to improve the known wax-liquid-smoke mixture so that it can be used to produce homogeneously coated food casings.

The object has been achieved by adding emulsifiers to the wax-liquid-smoke mixture. The water-in-oil emulsion can be stored and processed without difficulty and without any need to remix the same. On cooling, again no separation of the emulsion occurs.

The emulsion may be used to produce coatings which are solid at room temperature on polymer casings, or else be used on cellulose hydrate casings. The layer formed after cooling has better adhesion and is also more flexible than that known from the abovementioned DE-A, so that even when the casing is turned inside out the layer does not flake away or crumble away, and also does not crack. It is therefore possible to begin by coating the outer side—a process easier to carry out industrially—and then to turn this inside out toward the inside.

The invention therefore provides a tubular food casing, one surface of which has a continuous layer which is solid under standard conditions of temperature and pressure, prepared from a mixture with a wax which is solid under these conditions and/or with a wax-like component and with a liquid smoke, wherein the mixture comprises an emulsifier which holds the mixture in a stable water-in-oil emulsion.

The skilled worker can use simple exploratory experiments to determine very rapidly which emulsifiers have this effect. Lecithin-based emulsifiers have proven to be particularly suitable. Examples of lecithin-based emulsifiers acceptable under food legislation are those obtainable as ®Adlec and ®Ultralec. The emulsifiers may in principle be nonionic, anionic or cationic, generally preferably nonionic. Emulsifiers having an HLB value (HLB=hydrophilic lipophilic balance) of from 2 to 9 have proven to be particularly advantageous. However, there are some exceptions here, and a variety of emulsifiers, such as sorbitan monooleate (®Span 80: HLB: 4.3), polyoxyethylene(20)-sorbitan monooleate (®Tween 80: HBL: 14.9) and ethoxylated soya fatty acid glycerides (®Imwitor) give very little or no stabilization of the emulsion. As yet no theory is available to explain or predict the effectiveness of individual emulsifiers.

The proportion of the emulsifier is generally from 0.2 to 5.0% by weight, preferably from 0.6 to 2.0% by weight, particularly preferably from 0.8 to 1.8% by weight, in each case based on the total weight of the emulsion. The emulsion may be prepared by vigorous mixing of the individual components. When the emulsion is allowed to stand and is cooled there is no separation of the water phase from the oil phase.

The wax and/or the wax-like component likewise migrate to some extent or entirely onto the meat emulsion. This constituent of the coating must therefore also be acceptable under food legislation. Particularly suitable materials are therefore animal waxes (such as beeswax), vegetable waxes (such as carnauba wax), fossil waxes (such as montan wax) or mineral waxes. Examples of wax-like components are chemically modified waxes, wax esters, wax alcohols and high-molecular-weight fats.

The melting point of the wax, or of the wax-like component or of a mixture of these, is generally at least 35° C.; preferably at least 45° C. It must liquefy at the temperature usually reached during scalding or cooking of the sausage, so that it can release the liquid smoke.

The liquid smoke itself may be a "natural" liquid smoke. A liquid smoke of this type may be obtained by carbonizing or dry-heating wood, preferably hardwood (such as hickory) and passing the smoke into pure water. The high acetic acid content of a natural liquid smoke of this type makes it strongly acid. The pH value of the liquid smoke may also be made neutral or alkaline by adding neutralizing agents (such as NaOH). The phenolic constituents of the liquid smoke tend to flocculate out at a pH of from about 5 to about 8, but this may be suppressed by adding suitable additives, such as glycerol. Besides this, or else in addition, the liquid smoke may also comprise usual and known additives, such as inorganic or organic colorants, in particular dyes or color pigments, or agents which increase viscosity. The use of natural liquid smoke generally gives the best result. It transfers a particularly intensive smoke color, smoke odor and smoke taste to the meat emulsion.

The weight ratio of wax to liquid smoke is generally from 1:1 to 3:1, preferably about 2:1. The water-in-oil emulsion obtained at a mixing ratio of this type results in a homogeneous coating which is solid at room temperature.

A particularly simple way of applying the emulsion is spraying. However, other known methods may also be used, for example doctor-coating. The process should generally be selected as a function of the thickness of the layer to be produced. Layers of various thicknesses can transfer greater or lesser amounts of liquid smoke. The layer thickness is generally from 5 to 100 $\mu$m, preferably from 10 to 50 $\mu$m. In industrial processes it is simpler to coat the outer side of the casing and then to turn the casing inside out so that the outer side becomes the inner side. However, it is also possible to produce the layer directly on the inner side.

In one preferred embodiment the substrate for the novel food casing is a synthetic-polymer-based casing having one or more layers. The outer and/or inner surface here frequently has a layer made from aliphatic, partly aromatic and/or entirely aromatic polyamide or copolyamide or made from an olefin, the surface of which has been roughened. Between these there may be an oxygen-barrier and/or water-vapor-barrier layer. There may also be two or more layers of this type. The layer may be composed of polyolefin, polyvinylidene chloride (PVDC), ethylene-vinyl alcohol copolymers (EVOH) or of other polymers. To prevent delamination of the individual layers, there are also frequently (relatively prevent delamination of the individual layers, there are also frequently (relatively thin) tie layers between these.

In another embodiment the substrate is a cellulose hydrate casing which may also have fiber reinforcement. Casings of this type may be produced by the viscose process which has been known for a long time, or by the N-methylmorpholine N-oxide (NMMO) process. Unlike in the viscous process, the NMMO process does not involve chemical derivatization of the cellulose, which is merely physically dissolved. The viscose solution and, respectively, the cellulose/NMMO/water solution may then be applied to a tube-shaped fiber material and regenerated. (The fiber material is generally a hemp-fiber paper given wet strength by bonding with suitable agents.)

The substrate may also be a starch-based casing or a casing based on mixtures of starch with other polymers. Collagen casings are also suitable.

All of these casings may also have other coatings or impregnations, besides the coating according to the invention. For example, it is advantageous to apply to the outer side of cellulose casings an impregnation which prevents mold formation.

The examples below illustrate the invention.

EXAMPLE 1

Polymer Casing

The outer side of a three-layer casing (layers in order of succession: polyamide/polyolefin+adhesion promoter/polyamide, casing obtainable as ®Nalobar) of 63 caliber (=63 mm internal diameter) was sprayed with an oil-in-water emulsion prepared by intensive mixing of

| | |
|---|---|
| 200 g | of beeswax, |
| 100 ml | of an acid liquid smoke (® Enviro 24 P from Red Arrow, Wisconsin) and |
| 4.2 g | of a lecithin-based nonionic emulsifier (HLB: 4; ® Adlec), | until a coherent layer had formed. The layer was then allowed to harden at room temperature. The casing was then turned inside out, stuffed with meat emulsion for a scalded-emulsion sausage, and scalded. The temperature in the scalding chamber was 78° C. and the temperature within the sausages was about 72° C. The sausages were then cooled. After removal of the casing it could be seen that the surface of the emulsion had absorbed the smoke color uniformly and had the desired untainted smoke aroma.

EXAMPLE 2

Cellulose Casing

The outer side of a hemp-fiber-reinforced cellulose hydrate casing (FDS colorless) of 45 caliber was sprayed with a water-in-oil emulsion prepared by intensive mixing of

| | |
|---|---|
| 200 g | of beeswax, |
| 100 ml | of an acid liquid smoke (® Supreme H from Red Arrow) and |
| 4.2 g | of a lecithin-based emulsifier (® Adlec), | until a coherent layer had formed. The layer was again hardened at room temperature. Immediately prior to stuffing, the casing was turned inside out so that the coated side was inside, then stuffed with emulsion and scalded as described above. After cooling and peeling away the casing, the emulsion was found to be uniformly colored and to have the typical smoked aroma.

Comparative Example

Example 1 was repeated with the single difference that an ethoxylated soya fatty acid glyceride (®Imwitor 470 from Condea Chemie GmbH) was used instead of the lecithin-based emulsifier. Once the mixing procedure had ended, phase separation began almost immediately and it was therefore impossible to use this mixture to produce a uniform coating.

What is claimed is:

1. A tubular synthetic polymer-based food casing having one or more layers, one surface of which has provided thereon a continuous layer which is solid under standard conditions of temperature and pressure, said continuous layer being prepared from a mixture comprising:

a wax, wax-like component, or a mixture of a wax and a wax-like component which is solid under said standard conditions of temperature and pressure, a liquid smoke and, a non-ionic, anionic or cationic emulsifier which holds the mixture in a stable water in-oil emulsion.

2. A food casing as claimed in claim 1, wherein the emulsifier is a lecithin-based emulsifier.

3. A food casing as claimed in claim 1, wherein the emulsifier has an HLB value from 2 to 9.

4. A food casing as claimed in claim 1, wherein the proportion of the emulsifier is from 0.2 to 5.0% by weight based on the total weight of the emulsion.

5. A food casing as claimed in claim 1, wherein the wax is beeswax or carnauba wax.

6. A food casing as claimed in claim 1, wherein the wax-like omponent is a high-molecular-weight fat.

7. A food casing as claimed in claim 6, wherein the high-molecular-weight fat is a triglyceride with long fatty acid substituents or is a high-molecular-weight paraffin.

8. A food casing as claimed in claim 1, wherein the melting point of the wax, or wax-like component, or of a mixture of these is at least 35° C.

9. A food casing as claimed in claim 1, wherein the liquid smoke is an acid liquid smoke.

10. A food casing as claimed in claim 1, wherein the weight ratio of wax and/or wax-like component to liquid smoke is from 1:1 to 3:1.

11. A food cuing as claimed in claim 1, wherein the weight ratio of wax and/or wax-like component to liquid smoke is about 2:1.

12. A food casing as claimed in claim 1, wherein the proportion of the emulsifier is from 0.6 to 2.0% by weight based on the total weight of to emulsion.

13. A food casing as claimed in claim 1, wherein the proportion of the emulsifier is from 0.8 to 1.8% by weight based on the total weight of the emulsion.

14. A food casing as claimed in claim 1, wherein the melting point of the wax, or wax-like component, or of a mixture of these is at least 45° C.

15. A food casing as claimed in claim 1, wherein said continuous layer has a thickness from 5 to 100 μm.

16. A food casing as claimed in claim 1, wherein said continuous layer has a thickness of from 10–50 μm.

* * * * *